June 8, 1926.

J. F. RUNKLE 1,588,144

GEAR SHIFT MECHANISM

Filed Sept. 18, 1920

Inventor
Jno. F. Runkle his Attorneys

June 8, 1926.

J. F. RUNKLE 1,588,144

GEAR SHIFT MECHANISM

Filed Sept. 18, 1920    7 Sheets-Sheet 3

June 8, 1926. 1,588,144
J. F. RUNKLE
GEAR SHIFT MECHANISM
Filed Sept. 18, 1920 7 Sheets-Sheet 5

June 8, 1926.  
J. F. RUNKLE  
1,588,144  
GEAR SHIFT MECHANISM  
Filed Sept. 18, 1920     7 Sheets-Sheet 6

Inventor  
Jno. F. Runkle  
By Bakewell, Byrnes & Parmelee  
his Attorneys

June 8, 1926.  
J. F. RUNKLE  
GEAR SHIFT MECHANISM  
Filed Sept. 18, 1920

Inventor  
Jno. F. Runkle  
By Bakewell, Byrnes & Parmelee  
his Attorney

Patented June 8, 1926.

1,588,144

UNITED STATES PATENT OFFICE.

JOHN F. RUNKLE, OF PITTSBURGH, PENNSYLVANIA, ASSIGNOR TO THE RUNKLE AUTOMATIC GEAR SHIFT CORPORATION, OF PITTSBURGH, PENNSYLVANIA, A CORPORATION OF DELAWARE.

GEAR-SHIFT MECHANISM.

Application filed September 18, 1920. Serial No. 411,174.

My invention relates to gear shift mechanisms for use in automobiles, or other places where the like shifting of gears is necessary, and is shown in the accompanying drawings forming part of this specification, in which:

Figure 14 is a plan view of the combination member;

Figure 15 is a side elevation of the elements shown in Figure 14;

In the following description of my invention it will be described as applied to an automobile but I desire it to be understood that in thus describing it I am not to be limited to its use on an automobile but it is thus applied and described merely for the purpose of illustrating the principles of operation and the details of construction of the device in one application thereof.

In a device for shifting gears for the changing of speed ratio between the power member and a driven member, simplicity, reliability of operation and ruggedness are essential to a satisfactory application of the same.

The simplicity of construction makes it possible for the device to be manufactured cheaply and also by its simplicity prolongs the life of the device and aids in reliability of operation on account of the relatively few parts employed; the reliability of operation is essential because failure to operate at a time of excitement or emergency would not only endanger the mechanism itself but also the machine to which it is applied as well as the life of the occupant of the machine; ruggedness of construction is desirable because devices of this character are subjected to unusual vibration and their application is of such a nature that delicacy of construction is not possible if satisfaction is to be secured.

It is the object of my invention to secure all of the advantages outlined above in a device which can readily be applied in the space available on modern automobiles, either when the automobiles are constructed and the device applied in the factory, or in cases where it is desired to apply the device to automobiles which have been sold to the consumer.

Figure 1:
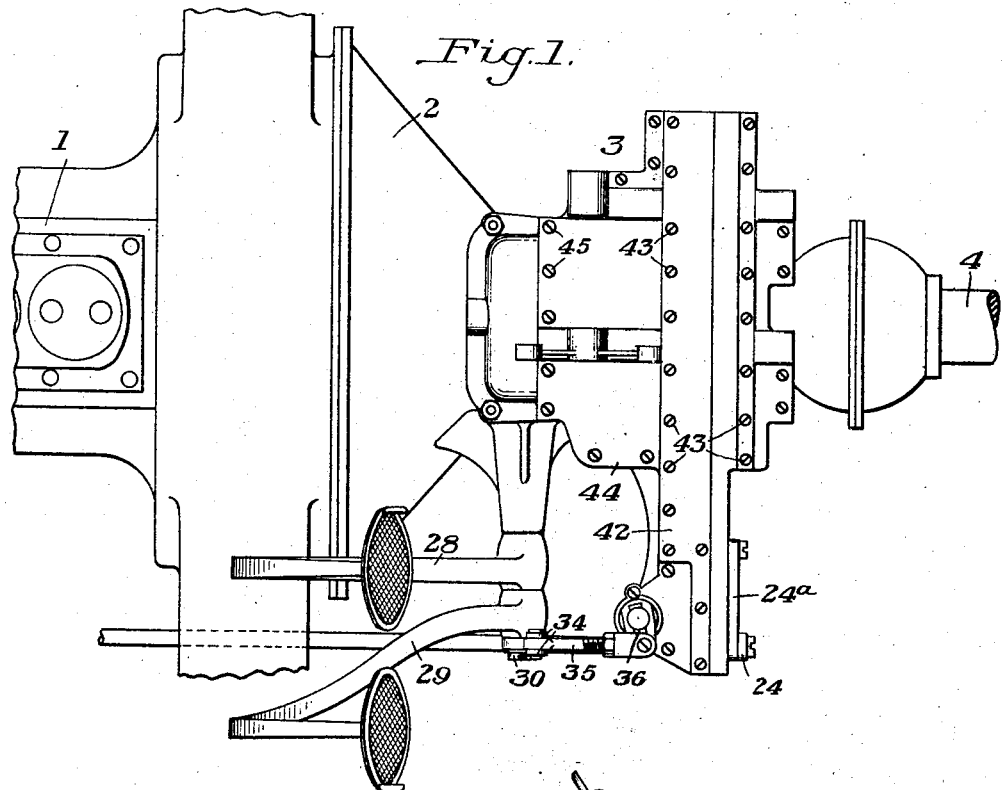
Figure 1 is a plan view of the device as applied to an automobile, part of which is shown.

Referring to the drawings in Figure 1, 1 is an engine of any suitable construction, 2 is the casing of the ordinary clutch, 3 is the gear shift device and 4 is the propeller shaft actuated by the engine through the clutch and the transmission and connected to the driving wheels of an automobile in any desired manner.

Figure 2:
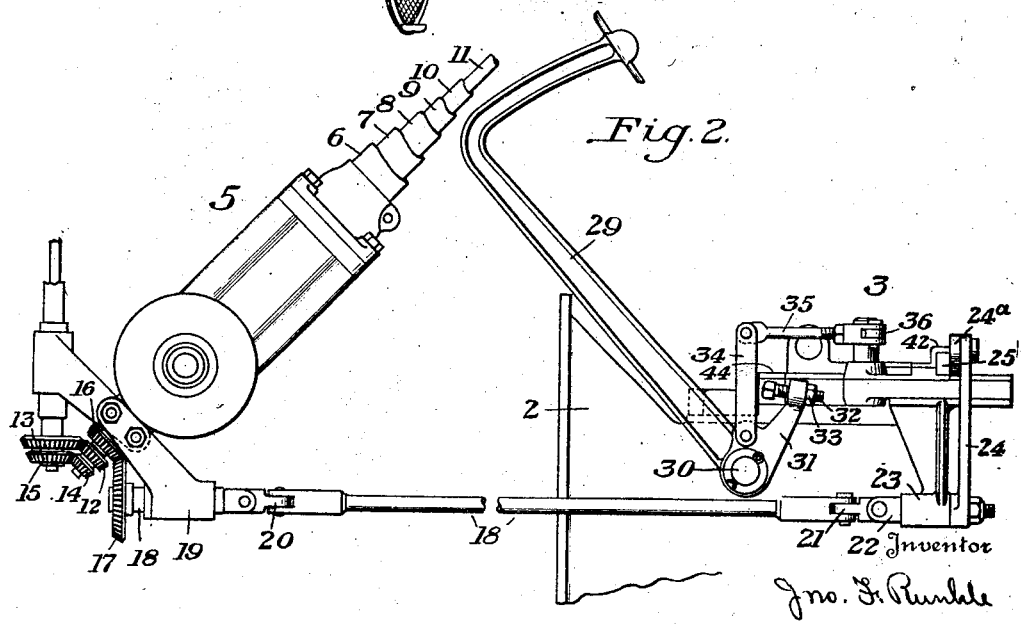
Figure 2 is a side elevation of the device showing also a part of a steering mechanism for automobiles.

In Figure 2, 5 is a steering device of any desired construction, comprising a stationary jacket 6, a steering tube 7, a stationary tube 8, a gear setting tube 9, a throttle tube 10, and a spark control tube or rod 11. The steering mechanism may be of any desired construction and therefore the connection of the steering wheel with the wheels of the vehicle will not be described in detail. The throttle tube 10 has a bevel gear 12 thereon which meshes with a similar gear 13 connected with the gas control mechanism of the carbureter in the usual way. The spark control tube or rod 11 has a bevel gear 14 thereon which meshes with a similar gear 15 connected with the distributer so as to advance or retard the spark in the usual manner. These elements do not constitute any part of my invention and may therefore take any desired form.

The gear setting tube has at the lower end thereof a bevel gear 16 thereon. This gear meshes with a similar gear 17 on a shaft 18 journalled in a bracket 19. This shaft is provided with a universal joint 20 and a second universal joint 21 connects the shaft 18 with the shaft 22 journaled in a bracket 23 which is carried by some fixed part of the automobile or other device to which the mechanism is applied.

Figure 3:
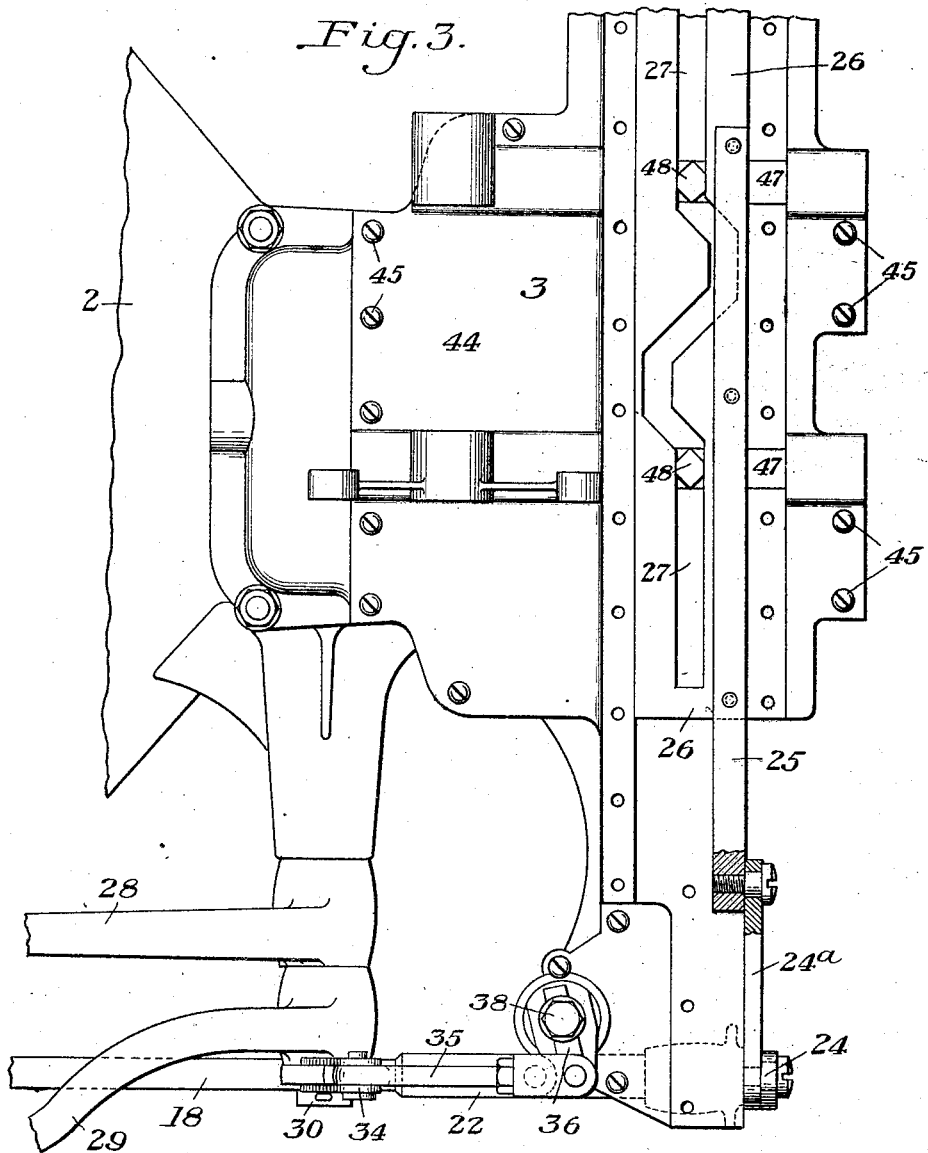
Figure 3 is a plan view of the device with the top cover removed showing certain parts of the interior of the device taken on line III—III of Figure 7.

The shaft 22 has a member 24 rigidly connected therewith. The member 24 is pivotally connected to a member 25, through a link 24ª, as shown in Figure 3. The member 25 is connected to a sliding selective member 26 provided with a cam slot 27 the purpose for which will be described later.

The automobile is provided with a brake lever 28 and a clutch lever 29, both mounted on a shaft 30 shown in Figure 1. The clutch lever 29 as shown in Figure 2, is provided with a bell crank 31, which has in the outer end thereof an adjustable bolt 32 with a lock nut 33 thereon. This lever is also provided with a link 34 to the free end of which is pivotally connected a link 35 which connects with a member 36, which in turn is adjustably connected to a member 37 pivoted at 38. The member 37 engages a sliding actuative member 39 by engaging a projection 40 near the end of the member 39. The member 39 is held in the position shown in Figure 4 by a retractile spring 41. When the member 39 is moved to the position shown in Figure 5 a gear shift operation is produced, as will be explained in detail later.

The transmission device of most of the automobiles made at the present time is provided with gears adapted to give three speeds forward and one speed reverse. The various gears and their detail relation to each other are not shown in the drawings of this case, as they constitute no part of the present invention. Only such parts as are necessary to make the operation of my device plain have been shown. This I have done in order to obviate confusion of the drawings in showing what I consider to be unnecessary details.

Figure 4:
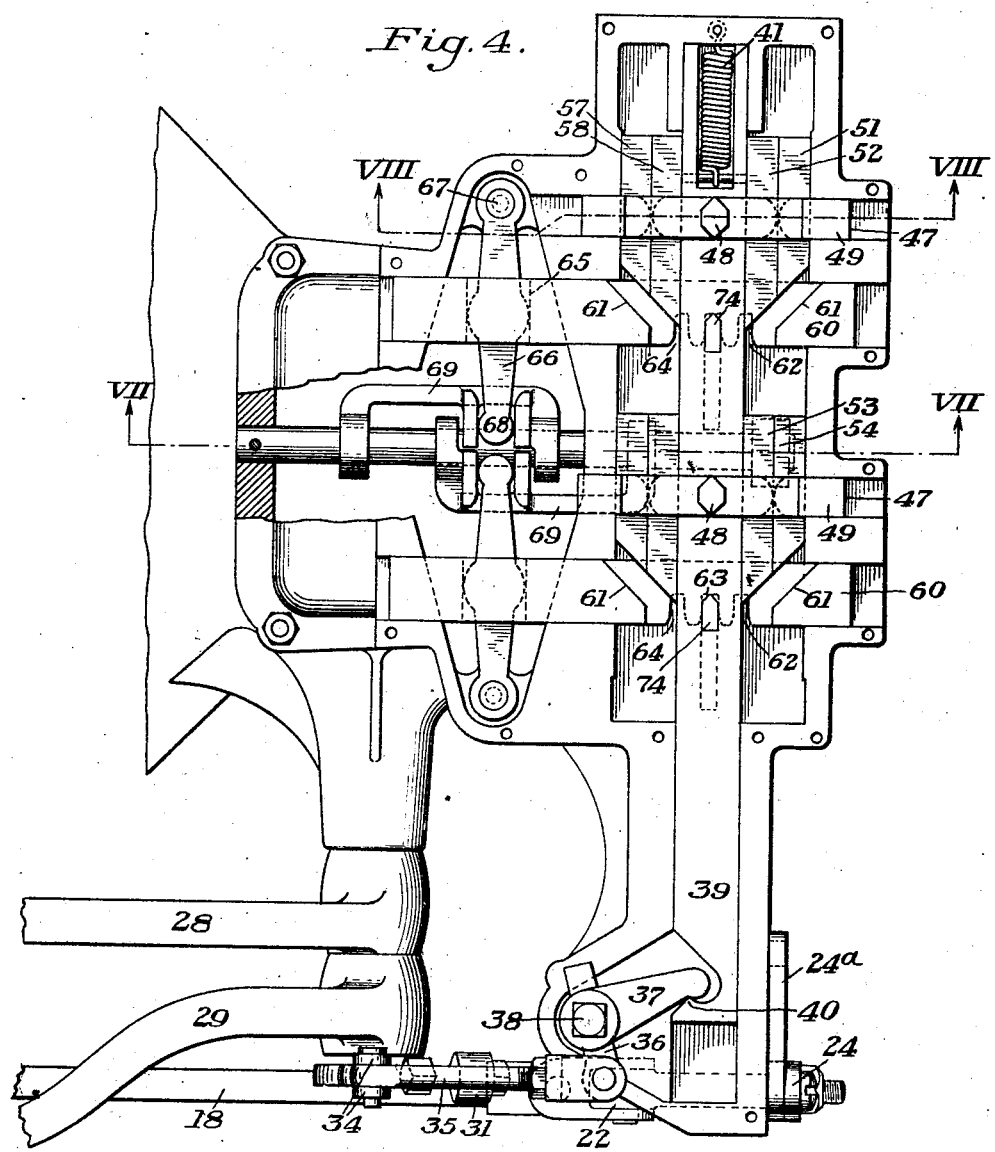
Figure 4 is a plan view of the interior on line IV—IV of Figure 7.
Figure 5:
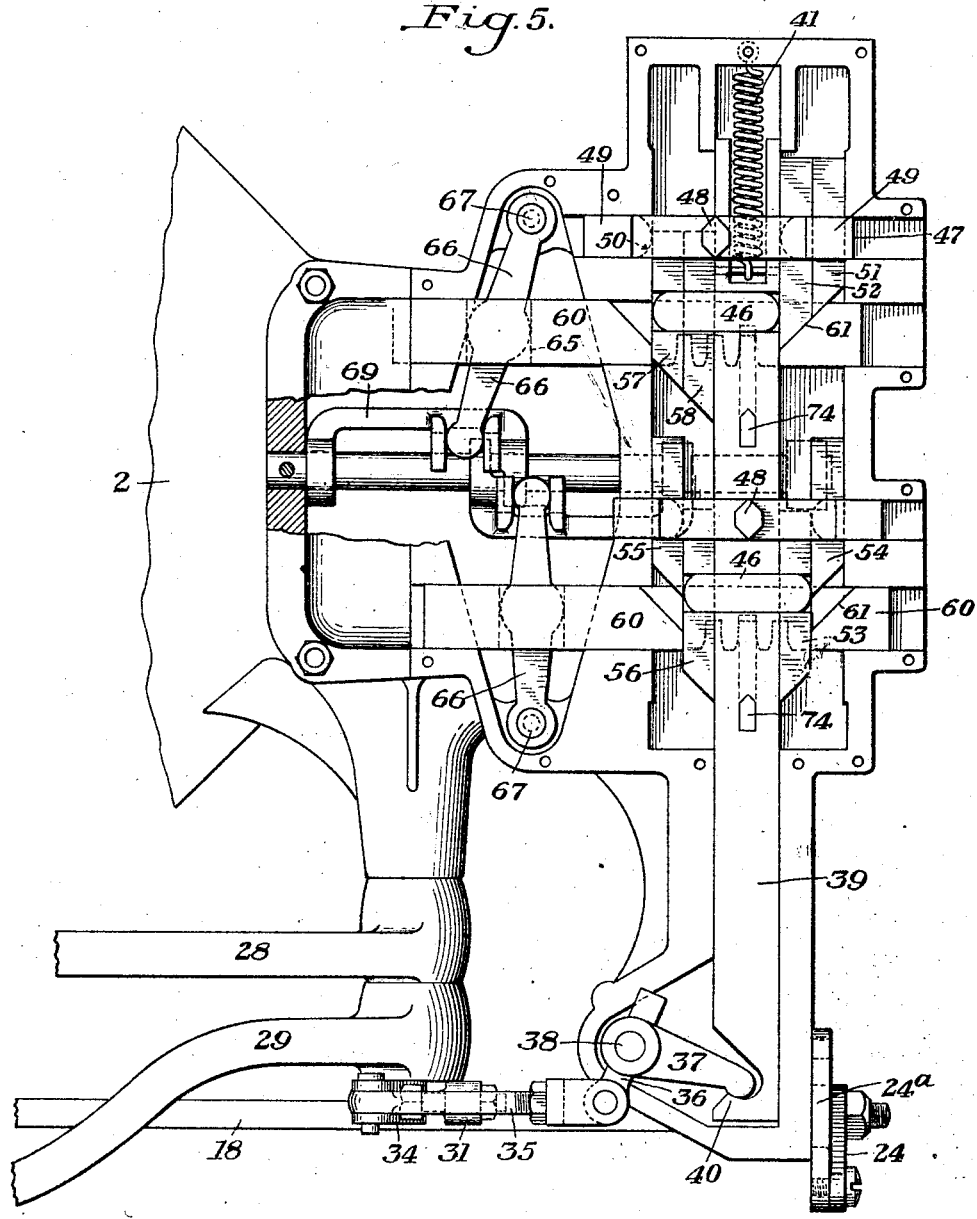
Figure 5 is a view similar to Figure 4 with the parts moved to the gear shift position.
Figure 6:
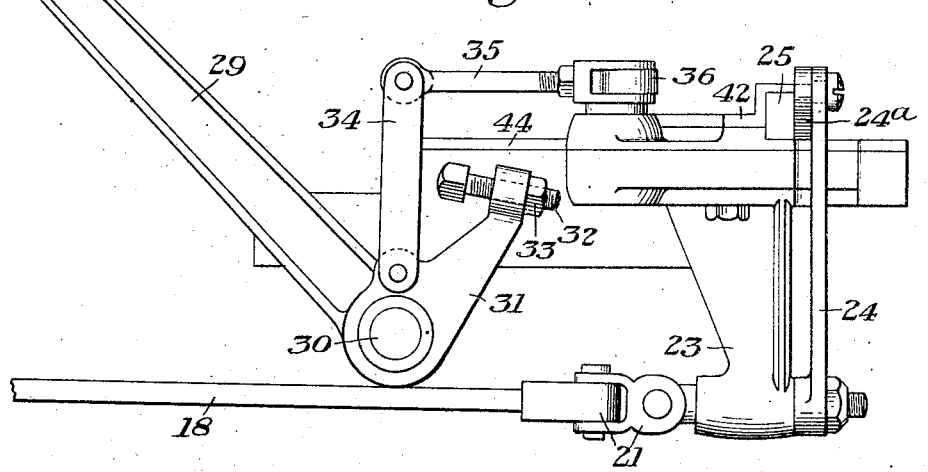
Figure 6 is a detail view showing the connection of the clutch lever with the gear shift mechanism.

The gear shift device with which my invention deals, comprises a top cover 42 held in place by screws 43 and an intermediate cover plate 44, held in place by screws 45. In a gear shift of this character it is necessary that only one set of gears be placed in mesh at a time and in throwing out one set of gears and throwing in another, the device should go through the neutral point. In my device this operation is effected by certain parts which will now be described, but in order that the general arrangement may be best understood an outline of the operation will be given and is as follows:

A lever arrangement on the steering wheel, or at any other convenient point, when operated moves a sliding combination member heretofore designated as 26 and the movement of that member arranges the parts within the shift mechanism so that when the clutch lever is pushed forward, and after the clutch is disengaged, the sliding member 39 is actuated from the position shown in Figure 4 to that shown in Figure 5, whereupon the parts as set up by the combination or selective member 26 cause the proper shift of the gears to effect the speed reduction determined by the lever on the steering wheel. The shifting of the gears is not accomplished until after the clutch is disengaged and the clutch lever thrown forward to substantially its limiting position. The parts which will produce the results above generally outlined will now be described.

The member 39 is provided with transverse slots in which are placed rounded ended members or floating keys 46. The member 47 shown in detail in Figures 14 and 15 is provided with a projection 48 at the center and also a projection 49 at each end. The lower side of this member is cut away so as to leave a rounded projection 50 at each end. The distance between the projections 50 is equal to the length of the members 46, so that when the member 47 is placed in position the member 46 is between the projections 50 and the thickness of the member 46 is equal to the height of the projections 50, so that when the member 46 is in place a continuous even surface extends across the projections 50. Provided on each side of the member 39 are four cam members 51, 52, 53, 54, 55, 56, 57 and 58. These cam members are provided with transverse slots of the same width as the slot in the member 39, which slots are equal to the width of the members 46 and 47. The cam members are all preferably of the same width, but the length of the adjoining cam members, as for instance 51 and 52, differs at one end so that when the transverse slots are in alignment one end of the cam members forms a continuous cam surface as shown at the lower end of the members in Figure 4. The cams 52, 53, 56 and 58 may be called the neutral shift cams and 51, 54, 55 and 57 the gear shift cams. The neutral shift cams are longer than the gear shift cams, so that no gear shift takes place until after the mechanism and the gears are in neutral position.

Figure 9:
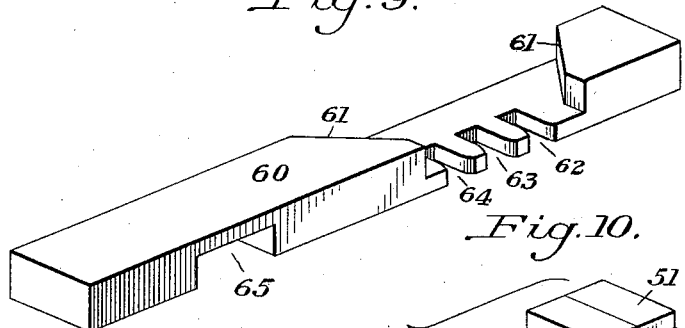
Figure 9 is a view in perspective of one of the shifting members.
Figure 10:
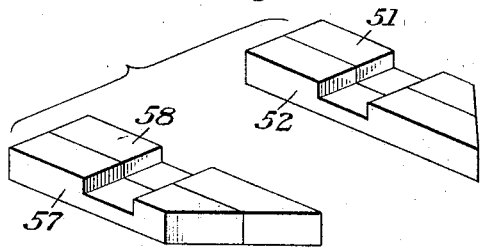
Figure 10 is a perspective view of certain shifting cams.

Whether or not any two adjacent cam members are locked together depends upon the position of the members 46 and 47. If the members 46 and 47 are in the position shown in Figure 4, the cam members 52, 53, 56 and 58 will move with the member 39 if it is actuated, whereas the cam members 51, 54, 55 and 57 will remain in the position shown in Figure 4. The gear which will be shifted depends upon the position of the members 46 and 47. The members 46 and 47 are actuated by the member 26 which has a cam slot 27 therein, which engages the projections 48. The member 26 is connected through mechanism already described with a lever 59 mounted on the steering post. If the member 26 is moved so as to throw the projection 48 of the upper member 47, as shown in Figure 5, to the left, the cam members 57 and 58 are locked together by the member 46 and also the projection 50 on the member 47 locks the cam members 51 and 52 together and holds them in the position shown in Figure 5, it being understood that the members 47 do not move with the member 39 but that the members 46 always move with the member 39. In the downward movement of the member 39, as shown in Figure 5, the cam surface produced by the cam members 57 and 58 engages a similar surface on a member 60. This member 60 being shown in detail in Figure 9. From Figure 9 it will be noted that the member 60 is provided with cam surfaces 61 and with three notches 62, 63 and 64 therein. There are two members 60 which are identical and therefore description of one will be sufficient. This member is also provided with a slot 65, which when in position receives a member 66 pivoted at 67 and the free end 68 of which engages a gear shifting member 69, as shown in Figure 5. Therefore a movement of the member 60 to the left, as shown in Figure 5, by engagement with the cam surface produced by the members 57 and 58, will cause the member 66 to be rotated in a clockwise direction and therefore a movement of the member 69 to the left will produce desired shifting of the gears. It will be noted that the other member 60 is not actuated because the lower member 46 remains in the neutral position and the cam members 53 and 56, while moved downwardly with the member 39 nevertheless pass the cam surface on the lower member 60 without actuating it in either direction. Attention is directed also to the fact that cam members 54 and 55 remain in the position shown in Figure 4, the same being held in that position by the projections 50 on the member 47.

Figure 7:
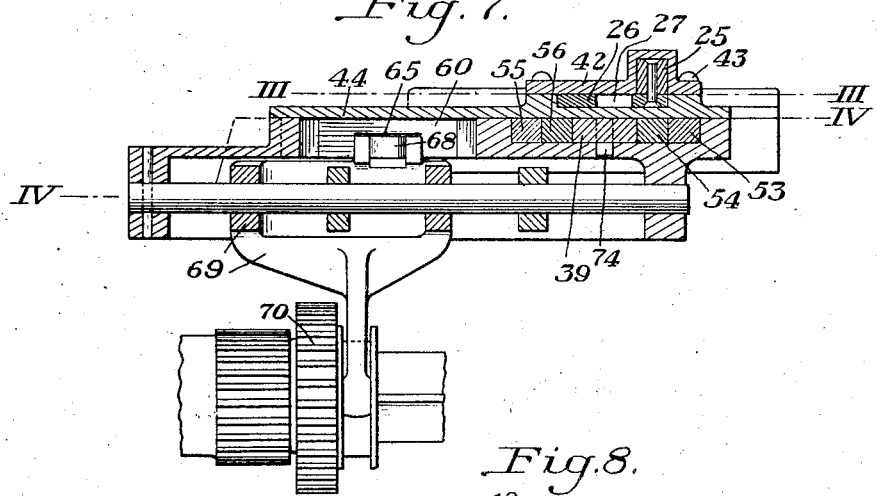
Figure 7 is a cross section on line VII—VII of Figure 4.
Figure 8:
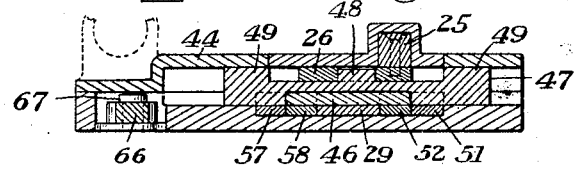
Figure 8 is a cross section on line VIII—VIII of Figure 4.

Figure 7 shows one of the gear shift members 69 and the manner in which that member is connected with the gears 70.

Figure 17:
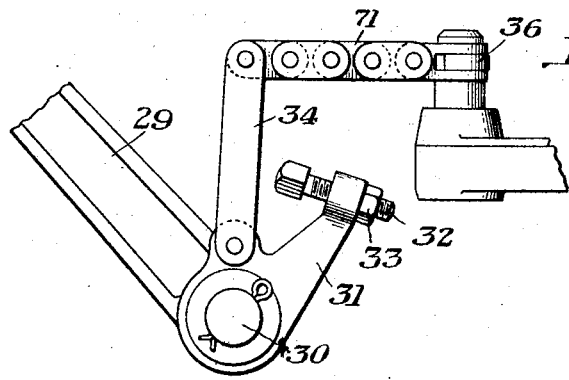
Figure 17 shows a modification of the means connecting the clutch lever to the shifting mechanism.

In the modification shown in Figure 17 the link 34 is connected with the member 36 by a flexible connection 71. This connection 71 may be of any desired construction, such as for instance a chain similar to the sprocket chain used on bicycles.

Figure 11:
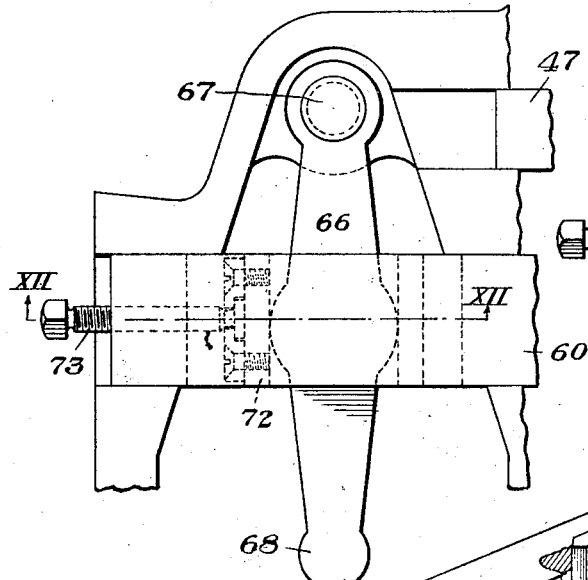
Figure 11 shows a modification in which the gear shifting mechanism is provided with adjusting means.
Figure 12:
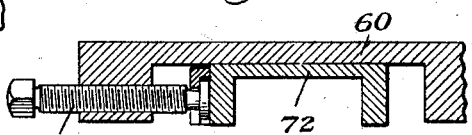
Figure 12 is a cross section on line XII—XII of Figure 11.

For the purpose of adjustment when applying this device to automobiles of different makes, I provide a means such as that shown in Figures 11 and 12, for varying the position of the member 66. This is accomplished by placing those members in an adjustable member 72 carried by the member 60 and a set screw 73, which when operated may move the member 72 either to the right or to the left, as shown in Figure 12. This adjustment is desirable in adjusting the device to gear shifts which vary somewhat and is a means whereby the device is made applicable to a large number of automobiles which vary slightly in the transmission construction.

Figure 13:
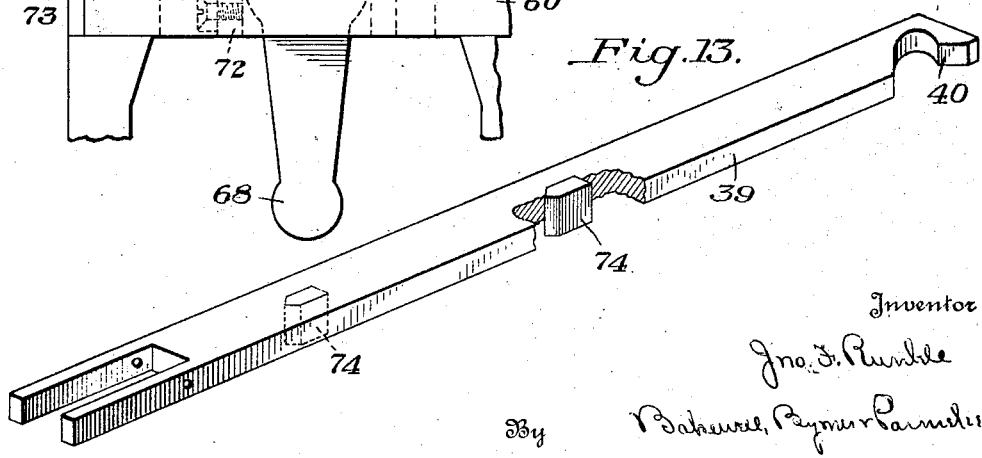
Figure 13 is a perspective view in detail showing locking means.

In all of these devices the member 39 is provided with projections 74 extending downwardly from the lower side as shown in Figure 13, which projections engage with one of the notches 62, 63 or 64 in the member 60, so as to hold the member 60 and the gear shifting lever 66 in any position in which that mechanism is placed. The lower projection 74 in Figure 5 engages the slots in the lower member 60, whereas the upper projection engages the notches in the upper member 60. It will be noted that these projections make the engagements with the notches when the member 39 returns to its normal position shown in Figure 4.

Figure 16:
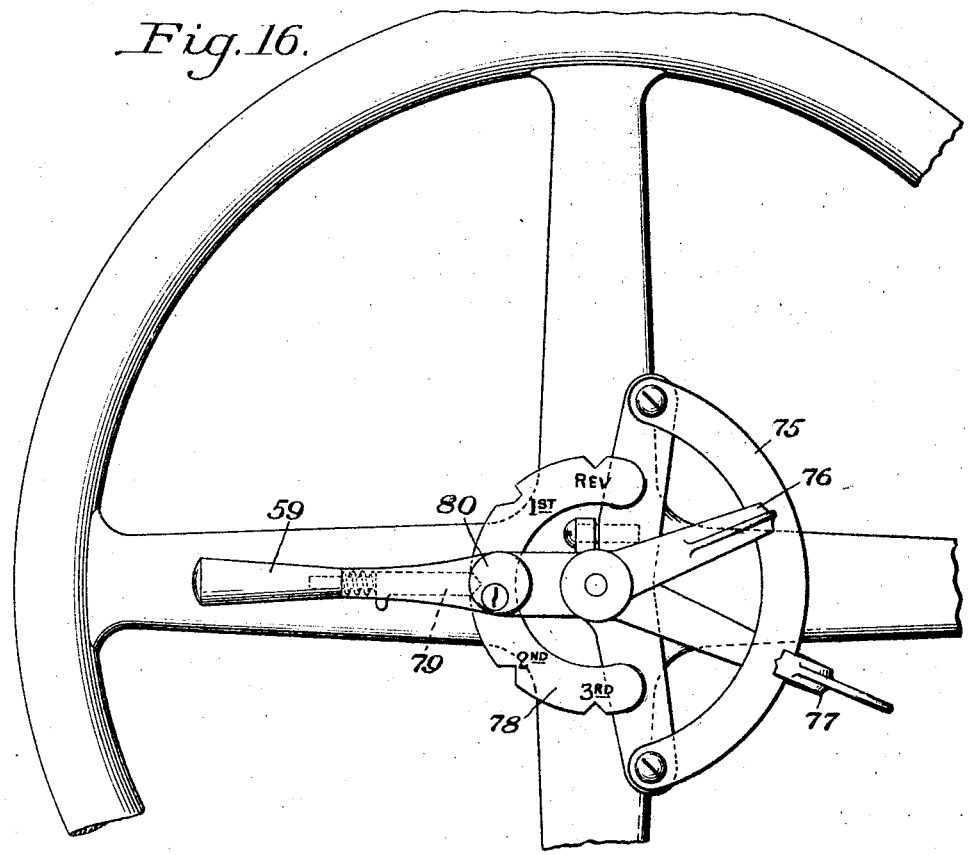
Figure 16 is a plan view of the steering wheel showing the relation of the control elements.

Referring to Figure 16 it is noted that the steering post carries the fuel control 75, on which operates the spark control lever 76 and the quadrant lever 77. I have attached to this same post a second quadrant 78 which has notches therein corresponding to reverse, first speed, neutral, second speed and third speed, and the lever 59 is connected with a spring pin 79 which engages these notches when the lever 59 is moved round the quadrant 78. There is also provided a lock 80 which locks the lever 59 to the quadrant 78, so that the transmission is in neutral position.

The operation of my device is as follows:—

Upon entering the car the lever 59 may be moved to the reverse position. This movement of the lever 59 rotates the gear 16, which in turn rotates the gear 17 and the shaft 22 and moves the members 24, 25 and 26 to a position which will throw the upper member 47 to the left as shown on Figure 5. This will lock the cam members 57 and 58 together. The clutch lever is then pushed forward and due to the lost motion between the screw 32 and link 34, the clutch will be disengaged before the screw 32 engages the link 34. After this engagement, however, the member 39 will be moved downwardly from the position shown in Figure 4 to that shown in Figure 5, through the connections 34, 35, 36 and 37. The downward movement of the member 39 and the cam members 57 and 58 which are locked together and to the member 39, causes the upper member 60 to be moved to the left which rotates the member 66 in clockwise direction and shifts the gears in the transmission to the reverse position. When the force is removed from the clutch lever the ordinary clutch spring will return the clutch to the engaged position and the spring 41 will return the member 39 to the position shown in Figure 4. However the gear shift member 60 will remain as shown in Figure 5 and the pin 74 will enter the notch 62 and lock the gear in the reverse position. It being evident to the driver that his next shift will be forward in the first speed, the lever 59 will be moved to first speed position at any time after the gear is thrown in reverse. This movement of the lever 59 to the first speed position through the same instrumentalities which have already been described, moves the members 46 and 47 to the right, as shown in Figure 5, to a position where the member 46 will lock the cam members 51 and 52 together and remove the lock between the members 57 and 58. Whenever the time arrives for shifting from reverse to first speed forward the clutch will be thrown out and the member 39 moved downward, whereupon the cam surface produced by the members 51 and 52 engages the cam surface 61 on the member 60 and throws that member to the right and with it the gear shifting lever 66 which is so connected that this movement will put the proper gears in mesh for the first speed forward.

If at any time it is desired to return the gears to neutral position, the lever 59 will be moved to the neutral position, whereupon the member 26 by engagement with the projections 48 will move both the two members 46 and the two members 47 to the position shown in Figure 4. This movement will remove the lock between all adjacent cam members but since the member 60 is at that time in its extreme right hand position, the cam member 58, which in the neutral position is locked to the member 39, will engage the cam surface on the member 60 and move it to the left to the position shown in Figure 4. The other gear shift positions are similar in all respects to the ones described and the operations necessary to produce those shifts will be apparent from the description already given. While I have described my device in great detail, I desire it to be understood that the embodiment of the invention shown in the drawings is given merely for the purpose of illustrating one embodiment and therefore I am not to be limited to the exact details shown, but my invention includes all modifications and equivalents which embody the principles set forth and I desire to be limited only by the claims forming a part hereof.

I claim:

1. In an automotive vehicle, a clutch, means for operating the clutch, a transmission including gears for affording a plurality of speeds forward and a reverse speed, mechanical means controlled by the clutch operating means for shifting the transmission gears, said mechanical means comprising a plurality of two-part sliding cam members, there being one part of each cam for each shift position and one part for each gear for returning a shifted gear to neutral position, means forming an operative gear shifting connection between said two-part cam members and the transmission gears, and means for operating said cams for determining the gears to be shifted, substantially as described.

2. In an automotive vehicle, a clutch, means for operating the clutch, a transmission device including gears affording a plurality of speeds forward and a reverse speed, mechanical means actuated by the clutch operating means for shifting the transmission gears, said mechanical means comprising a plurality of sliding cams, one for each shift position and all located in a common horizontal plane, means forming an operative gear shifting connection between said two-part cam members and the transmission gears, and means for operating said cams for selectively controlling the gear shifting means, substantially as described.

3. In a transmission device, a plurality of gears affording a plurality of speeds, means for shifting said gears comprising a sliding two-part cam for each shift position, means forming an operative gear shifting connection between said two-part cam members and the transmission gears, means for selectively locking the two parts of any cam together to determine which gear shall be shifted and means for operating said cams, substantially as described.

4. In a transmission device, a plurality of gears affording a plurality of speeds, means for shifting the gears comprising a multipart cam for each shift position, means for locking the parts of any cam together to determine which gear shall be shifted, means forming an operative connection between said multi-part cams and the gears, and a sliding member for moving said multi-part cams, substantially as described.

5. In a transmission device, a plurality of gears affording a plurality of speeds, means for shifting the gears comprising a multipart cam for each shift position, means for locking the parts of any cam together to determine which gear shall be shifted, means forming an operative connection between said multi-part cams and the gears, a sliding member for moving said multi-part cams, and means for locking the shifted gear in shifted position, substantially as described.

6. In a transmission device, the combination of a source of power, a plurality of gears for affording a plurality of speeds, means for connecting the gears to the source of power comprising a cam for each shift position and a cam for neutralizing each previously shifted gear before engaging another gear and a cam member for determining which gear shall connect with the power source locking certain of said cams together, and means for operating said cam members, and means operated by the cams for shifting the gears, substantially as described.

7. In a transmission device the combination of a source of power, a clutch, a lever for operating the clutch, a plurality of gears for affording a plurality of speeds, means for connecting said gears to the said source comprising a cam for each shift position, and a cam for neutralizing each previously shifted gear before engaging another gear, a sliding cam control, means for determining which of said gears shall be connected to said source and means actuated by the clutch lever for operating said cams, substantially as described.

8. In a transmission device, the combination of a source of power, a clutch, a plurality of gears for affording a plurality of speeds, means for shifting said gears comprising a slidable member, members parallel with said slidable member having surfaces adapted to constitute cams, means for connecting certain of said parallel members to said slidable member, all of said members being in the same plane, operative connections between said parallel members and said gears, and means for determining which of said parallel members shall be connected to said slidable member and means for sliding said slidable member dependent upon the position of said clutch, substantially as described.

9. In a gear shift device, the combination of two gear shift members having cam surfaces, each adapted to be moved to two positions, a member for actuating said gear shift members, two sets of cam members on each side of said actuating member and symmetrically arranged, said sets each comprising two members and means for locking any two of said sets of cam members together and to said actuating member, substantially as described.

10. In a gear shift device, the combination of two gear shift members, each adapted to be moved to two positions, cam surfaces on said members, a member for actuating said gear shift members, two sets of cam members on each side of said actuating member and symmetrically arranged, said sets each comprising two members, a casing for said parts, a selective member positioned in said casing, a cam locking member adapted to be operated by said selective member for locking one set of cam members together and to said actuating member and means for controlling said locking member, substantially as described.

11. In a transmission device, the combination of two gear shift members each having a neutral and two gear-engaging positions, cams for operating the shift members to the different positions, means for actuating the cams and means controlling the cams to cause an operated shift member to move to neutral position before another gear shift is effected, and means for simultaneously locking certain of said cams to and releasing certain of said cams from the actuating member, substantially as described.

12. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position and a member adjacent each of said four members for moving said shift members to the gear engaging positions and means for simultaneously coupling and releasing certain of said members and the actuating member, substantially as described.

13. In a transmission device, the combination of two gear shift members, each having a neutral and two gear engaging positions, an actuating member for said shift members, cams for operatively connecting said actuating member to said gear shift member, said cams comprising four members adjacent said actuating member for moving the shift members to neutral position, and a member adjacent each of said four members and shorter than said members for moving said shift members to the gear engaging positions and means for simultaneously coupling and releasing certain of said members and the actuating member, substantially as described.

14. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, and means for locking said adjacent members together and to said actuating member, substantially as described.

15. In a transmission device, the combination of two gear shift members, each having a neutral and two gear engaging positions, an actuating member for said shift members, cams for operatively connecting said actuating member to said gear shift member, said cams comprising four members adjacent said actuating member for moving the shift members to neutral position, a member adjacent each of said four members and shorter than said members for moving said shift members to the gear engaging positions, and means for locking said adjacent members together and to said actuating member, substantially as described.

16. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, and a floating key for locking two cam members to said actuating member, substantially as described.

17. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, and a floating key engaging a transverse opening in said actuating member and a like opening in said cam members for locking two of said members to said actuating member, substantially as described.

18. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, a floating key for locking two cam members to said actuating member, and means for controlling said floating key, substantially as described.

19. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, and a floating key engaging a transverse opening in said actuating member, and a like opening in said cam members for locking two of said members to said actuating member, and means for controlling said floating key, substantially as described.

20. In a transmission device, the combination of two gear shift members, each having a neutral and two gear engaging positions, an actuating member for said shift members, cams for operatively connecting said actuating member to said gear shift members, said cams comprising four members adjacent said actuating member for moving the shift members to neutral position, a member adjacent each of said four members for moving said shift members to the gear engaging positions, a floating key for locking two cam members to said actuating member, means for controlling said floating key, said means also locking the remaining two of said four members in position, substantially as described.

21. In a transmission device, the combination of a plurality of gears, each adapted to be shifted to an operative position and a neutral position, a sliding member for effecting said shifts, a neutralizing member and an operative shift member for each gear and means for connecting the neutralizing member of any operative gear and the operative member of the prospective operative gear to said sliding member, and means for operating said sliding member, substantially as described.

22. In a transmission device, the combination of a plurality of gears, each adapted to be shifted to an operative position and a neutral position, a sliding member for effecting said shifts, a neutralizing member and an operative shift member for each gear, means for connecting the neutralizing member of any operative gear and the operative member of the prospective operative gear to said sliding member, so that the operation of said neutralizing member will act in point of time prior to said operative member, and means for operating said sliding member, substantially as described.

23. In a transmission device including a plurality of transmission gears, the combination of a plurality of shiftable members, operating connections between said shiftable members and the gears, means for shifting said members from neutral position to operative position, said means comprising a plurality of sectional sliding cam members, means locking the sections of certain of said cam members together to disengage any operative gear before moving a gear from neutral to operative position, and means for operating said cam members substantially as described.

24. In a transmission device, the combination of a plurality of gears, each of which is adapted to be shifted to an operative position and a neutral position, a sliding member having operative connections for moving said gears to the various positions, members having cam surfaces for co-operating with said sliding member to effect the said shifts, means for selectively rendering said cam surfaced members operative to effect the desired shifts, and means for positively locking the gears in shifted position, substantially as described.

25. In a transmission device, the combination of power transmission gears, each movable between neutral and operative positions, gear-shifting elements for said gears for moving each of said gears to neutral or operative position, a sliding cam member for operating said shifting elements, means selectively and operatively connecting said shifting elements to said sliding member to move any operating gear to neutral position and subsequently move any of said power transmission gears to operative position, and means for positively locking a shifted gear in shifted position, substantially as described.

26. In a transmission device, the combination of a plurality of shiftable elements, means for selectively controlling said elements, said means comprising a slidable member, attachable members having cam surfaces thereon, and selective means for attaching said attachable members to said sliding member to select the element to be shifted, and means for actuating the sliding member, substantially as described.

27. In a transmission device, the combination of a plurality of gears, a sliding member for shifting said gears from neutral to operative position and vice versa, a plurality of members having cam surfaces for each of said gears, selective means for attaching and detaching certain of said cam surfaced members to said slidable member to neutralize all of said gears and place a selected gear in operative position, and means for operating said selecting member, substantially as described.

28. In a transmission device including transmission gears, the combination of two shiftable members each adapted to be shifted to two positions, operating connections between said members and the gears to be shifted, four neutralizing members and four actuating members, a sliding member for operating said neutralizing and actuating members, means for locking three of said neutralizing and one of said actuating members to said sliding member, and means for actuating the sliding member, substantially as described.

29. In a transmission device including transmission gears, the combination of two shiftable members each adapted to be shifted to two positions, operative connections between said members and the gears to be shifted, four neutralizing members and four actuating members, a sliding member for operating the neutralizing and actuating members, and means for locking four of said members to said sliding member, substantially as described.

30. In a transmission device including transmission gears, the combination of two shiftable members each adapted to be shifted to two positions, operating connections between said members and the gears to be shifted, four neutralizing members and four actuating members, a sliding member for operating the neutralizing and actuating members, and means for locking three of said neutralizing members and any one of said actuating members to said sliding member, substantially as described.

In testimony whereof I have hereunto set my hand.

JOHN F. RUNKLE.